UNITED STATES PATENT OFFICE.

JOHN D. LEE, OF TRENTON, NEW JERSEY.

IMPROVED COMPOSITION FOR WATERPROOFING.

Specification forming part of Letters Patent No. 55,507, dated June 12, 1866.

*To all whom it may concern:*

Be it known that I, JOHN D. LEE, of Trenton, in the county of Mercer and State of New Jersey, have invented a new and useful Composition for Rendering Boots and Shoes Water-Proof; and I do hereby declare that the following is a full, clear, and exact description of the same.

The composition is composed of two parts of rosin, one part of beeswax, one part of mutton-suet, and one part of neat's-foot oil, the whole being melted together and spread on muslin or thin leather and placed between the insole and outsole and between the upper and lining of the boots and shoes, thereby preventing any dampness from striking through the boot or shoe to the foot of the wearer.

What I claim for my invention, and desire to secure by Letters Patent, is—

The mixing of the ingredients and the applying them to boots and shoes to render them impervious to water, as herein described.

JOHN D. LEE.

Witnesses:
    M. P. HENDRICKSON,
    C. H. KNOWLES.